(12) United States Patent
MacNicol et al.

(10) Patent No.: US 6,341,281 B1
(45) Date of Patent: Jan. 22, 2002

(54) DATABASE SYSTEM WITH METHODS FOR OPTIMIZING PERFORMANCE OF CORRELATED SUBQUERIES BY REUSING INVARIANT RESULTS OF OPERATOR TREE

(75) Inventors: Roger Dermot MacNicol, Needham; Steven A. Kirk, Chelmsford, both of MA (US); Randall George Bello, Hampton, NH (US); Jun Rao, New York, NY (US); Katherine Tsouya Yang, Andover, MA (US)

(73) Assignee: Sybase, Inc., Emeryville, CA (US)

(*) Notice: Subject to any disclaimer, the term of this patent is extended or adjusted under 35 U.S.C. 154(b) by 0 days.

(21) Appl. No.: 09/285,408

(22) Filed: Apr. 2, 1999

Related U.S. Application Data

(60) Provisional application No. 60/081,782, filed on Apr. 14, 1998.

(51) Int. Cl.[7] ............................................. G06F 17/30
(52) U.S. Cl. ................................. 707/3; 707/2; 707/4
(58) Field of Search ..................................... 707/1–10

(56) References Cited

U.S. PATENT DOCUMENTS

| | | |
|---|---|---|
| 4,527,253 A | 7/1985 | Sato et al. |
| 4,947,319 A | 8/1990 | Bozman |
| 5,062,055 A | 10/1991 | Chinnaswamy et al. |
| 5,210,870 A | 5/1993 | Baum et al. |
| 5,237,681 A | 8/1993 | Kagan et al. |
| 5,317,727 A | 5/1994 | Tsuchida et al. |
| 5,317,742 A * | 5/1994 | Bapat ............................ 707/3 |
| 5,367,656 A | 11/1994 | Ryan |
| 5,367,675 A * | 11/1994 | Cheng et al. ................... 707/2 |
| 5,379,419 A * | 1/1995 | Heffernan et al. ............. 707/4 |
| 5,394,531 A | 2/1995 | Smith |
| 5,412,804 A * | 5/1995 | Krishna .......................... 707/2 |
| 5,450,561 A | 9/1995 | Ryan |
| 5,465,342 A | 11/1995 | Walsh |
| 5,465,352 A | 11/1995 | Nakazawa et al. |
| 5,495,591 A | 2/1996 | Ryan |
| 5,526,511 A | 6/1996 | Swenson et al. |
| 5,537,635 A | 7/1996 | Douglas |
| 5,548,755 A * | 8/1996 | Leung et al. ................... 707/2 |
| 5,668,987 A * | 9/1997 | Schneider ....................... 707/3 |
| 5,812,996 A * | 9/1998 | Rubin et al. .................... 707/2 |
| 5,822,749 A * | 10/1998 | Agarwal .......................... 707/2 |
| 5,822,750 A * | 10/1998 | Jou et al. ......................... 707/2 |
| 5,832,475 A * | 11/1998 | Agrawal et al. ................ 707/2 |
| 5,852,821 A * | 12/1998 | Chen et al. ..................... 707/2 |
| 6,032,144 A * | 2/2000 | Srivastava et al. ............. 707/3 |
| 6,134,546 A * | 10/2000 | Bestgen et al. ................ 707/4 |
| 6,182,060 B1 * | 1/2001 | Hedgcock et al. ............. 707/1 |

* cited by examiner

*Primary Examiner*—Hosain T. Alam
*Assistant Examiner*—Anh Ly
(74) *Attorney, Agent, or Firm*—John A. Smart

(57) ABSTRACT

Database system and methods are described for improving execution speed of database queries (e.g., for decision support) by optimizing execution of nested queries or "subqueries," which are commonly used in client/server database environments. In particular, the basic approach employed is to recognize the part of the subquery that is not related to the outer references and cache the result of that part after its first execution. Later, the result can be reused and combined with the result of the rest of the subquery that is changing for each iteration. Methods are employed to recognize the invariant part of a data flow tree, and to restructure the evaluation plan to reuse the stored intermediate result. An efficient method is used to teach an existing join optimizer to understand the invariant feature and thus allow it to be able to generate better join plans in the new context. When query rewriting is not possible, therefore, the invariant technique provides significantly better performance than the traditional nested iteration method.

35 Claims, 15 Drawing Sheets

(a) Plan 1

(b) Plan 2

PLANS FOR A CORRELATED SUBQUERY

TABLES:

```
        TABLE T1              TABLE T2
       ⎛-310               ⎛-320
       C1  |  C2            C3  |  C4
       ----+----            ----+----
        1  |   1             1  |   0
        2  |   4             2  |   1
        3  |   6             3  |   0
        4  |  10             4  |   1
```

SQL QUERY:                                    ╱-330

SELECT C1 FROM T1 WHERE
   C2=(SELECT MAX(C3) FROM T2 WHERE T2.C4 = T1.C1)
   |_____|
                                                                                                                  ⎱-335

FIG. 3A

PLANS FOR A CORRELATED SUBQUERY

EXAMPLE 2.1

```
void open(df_node nd) {
  if (this is the first time) {
    if (there is a storage element in nd called store) {
      if (nd is in a correlated subquery and is an invariant)
        Call SetExpectRewind(store, TRUE).
      else
        Call SetExpectRewind(store, FALSE).
      Set store as unloaded.
    }
  }
  else // subsequent calls
    if (there is a storage element in nd called store)
      if (nd is in a correlated subquery and is an invariant) {
        if (store has been loaded)
          Rewind store.
      }
      else {
        Reset store.
        Set store as unloaded.
      }
    Prepare as before.
}
```

METHOD 3.1

FIG. 5

```
int next(df_node nd) {
   if (there is a storage element in nd called store
       and store has not been loaded yet) {
     Fill in store by fetching all the tuples from the child.
     Set store as loaded.
   }
   Continue the remaining execution by retrieving rows
   from store.
}
```

METHOD 3.2

FIG. 6

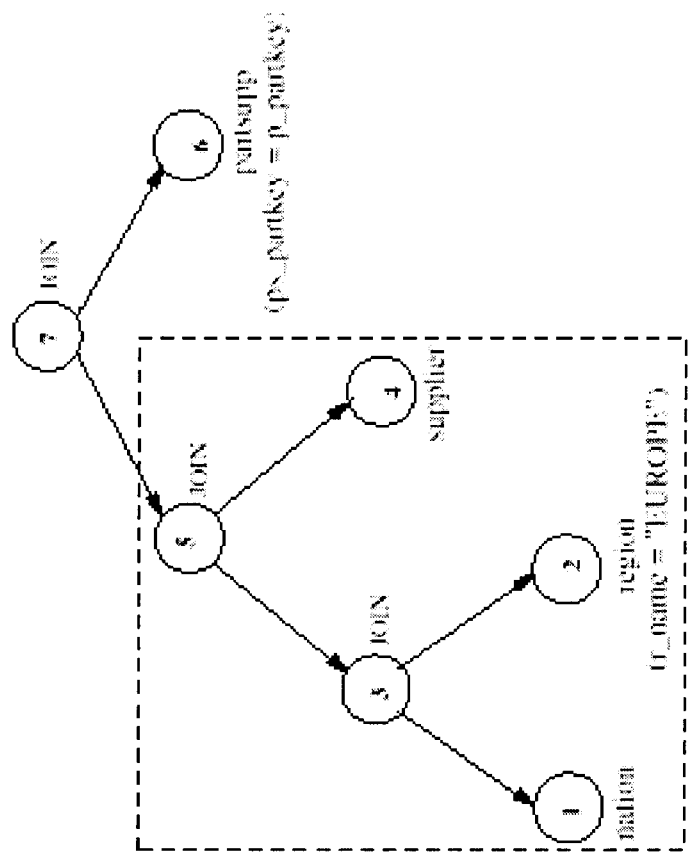
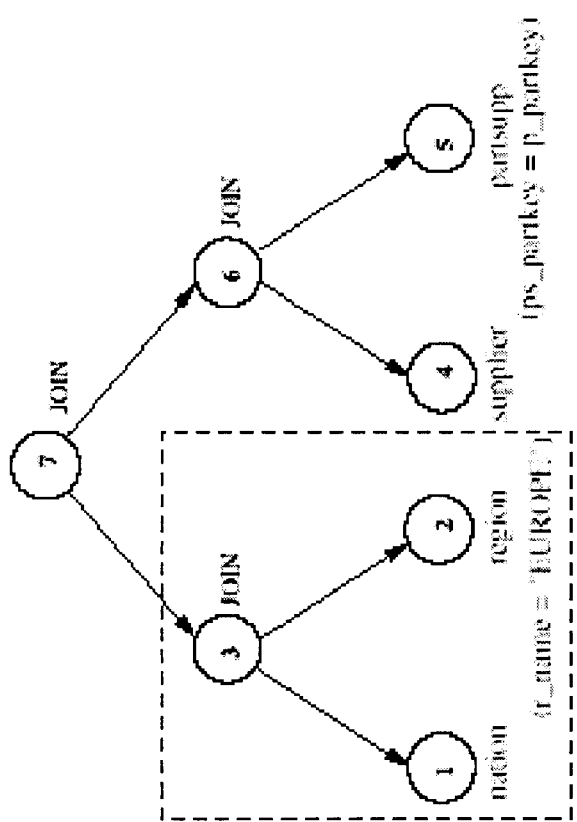
FIG. 7
PLANS FOR THE CORRELATED SUBQUERY IN QUERY 1(A)

```
create view V0 as
select   s_acctbal, s_name, n_name, p_partkey, p_mfgr,
         s_address, s_phone, s_comment, ps_supplycost
from part, partsupp, supplier, nation, region
where p_partkey      = ps_partkey
   and s_suppkey     = ps_suppkey
   and p_size        = 15
   and p_type like  "%BRASS%"
   and s_nationkey   = n_nationkey
   and n_regionkey   = r_regionkey
   and r_name        = "EUROPE"

create view V1 as
select distinct p_partkey
from V0 create view V2(ps_partkey, mincost) as
select V1.p_partkey, min(ps_supplycost)
from partsupp, supplier, nation, region, V1
where V1.p_partkey   = ps_partkey
   and s_suppkey     = ps_suppkey
   and s_nationkey   = n_nationkey
   and r_name        = "EUROPE"
group by V1.p_partkey select   s_acctbal, s_name, n_name, p_partkey, p_mfgr,
         s_address, s_phone, s_comment
from V0, V2
where V0.ps_supplycost = V2.mincost
   and V0.p_partkey = V2.ps_partkey
order by s_acctbal desc, n_name, s_name, p_partkey
```

REWRITTEN QUERY 1

FIG. 10

PLANS FOR Q1

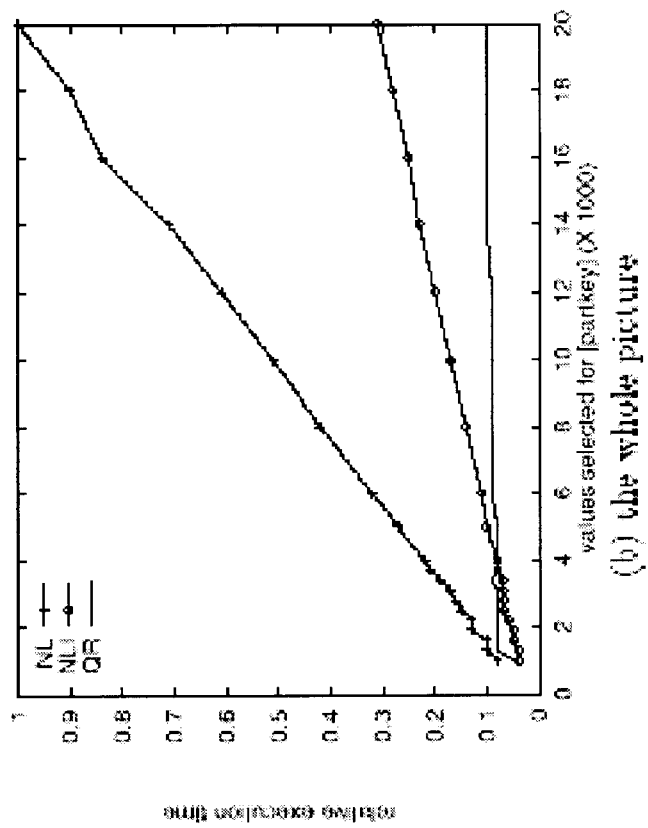
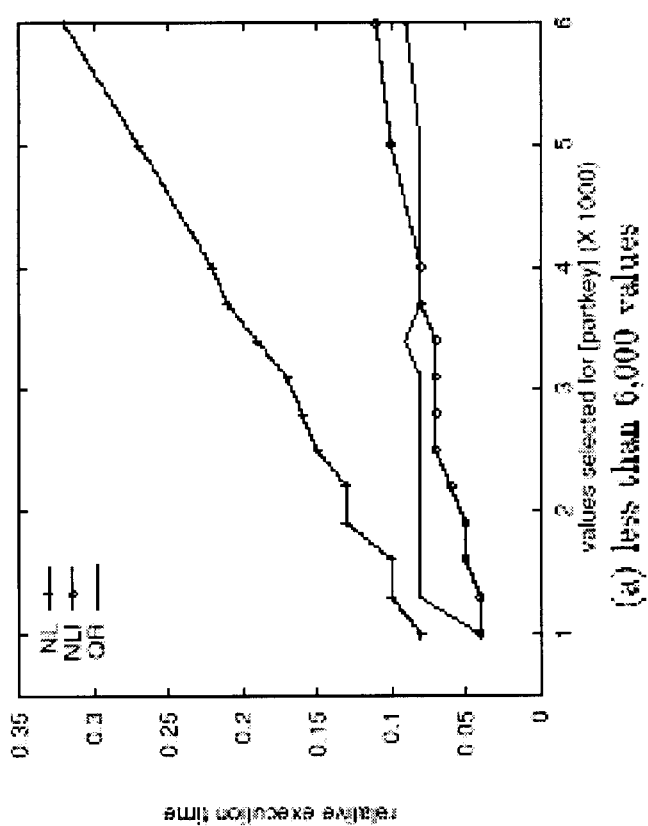
FIG. 13
QUERY 2 (SCALE FACTOR 1)

DATABASE SYSTEM WITH METHODS FOR OPTIMIZING PERFORMANCE OF CORRELATED SUBQUERIES BY REUSING INVARIANT RESULTS OF OPERATOR TREE

RELATED APPLICATIONS

The present application claims the benefit of priority from and is related to the following commonly-owned U.S. provisional application: application serial No. 60/081,782, filed Apr. 14, 1998. The disclosure of the foregoing application is hereby incorporated by reference in its entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to optimizing the process of retrieving information stored in a data processing system, such as a Database Management System (DBMS).

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See, e.g., Date, C., *An Introduction to Database Systems,* Volumes I and II, Addison Wesley, 1990; the disclosure of which is hereby incorporated by reference.

DBMS systems have long since moved from a centralized mainframe environment to a de-centralized or distributed environment. One or more PC "client" systems, for instance, may be connected via a network to one or more server-based database systems (SQL database server). Commercial examples of these "client/server" systems include Powersoft™ clients connected to one or more Sybase Adaptive Server™ (formerly, Sybase SQL Server™) database servers. Both Powersoft™ and Sybase Adaptive Server™ are available from Sybase, Inc. of Emeryville, Calif.

As the migration to client/server continues, each day more and more businesses are run from mission-critical systems which store information on server-based SQL database systems, such as Sybase SQL Server™. As a result, increasingly higher demands are being placed on server-based SQL database systems to provide enterprise-wide decision support—providing timely on-line access to critical business information (e.g., through "queries"). Accordingly, there is much interest in improving the performance of such systems, particularly database queries, for enhancing decision support.

SUMMARY OF THE INVENTION

The present invention comprises a Client/Server Database System with improved methods for performing database queries. In an exemplary embodiment, the system includes one or more Clients (e.g., Terminals or PCs) connected via a Network to a Server. The Server, operating under a server operating system (e.g., UNIX®, available from Novell, Inc. of Provo, Utah) includes a Database Server System, such as Sybase SQL Server™. In general operation, Clients store data in and retrieve data from one or more database tables resident on the Server by submitting SQL commands, some of which specify "queries"—criteria for selecting particular records of a one or more tables. For enhancing the speed in which the Database Server performs queries, a new invariant technique is introduced to evaluate correlated queries (i.e., queries containing one or more correlated subqueries) efficiently.

Correlated queries are very common and important in decision support systems. Traditional nested iteration evaluation methods for such queries can be very time consuming. When they apply, query rewriting techniques have been shown to be much more efficient, but query rewriting is not always possible. When query rewriting does not apply, something better can be done than the traditional nested iteration methods.

The basic approach of the present invention, therefore, is to recognize the part(s) of the subquery that is not related to the outer references and cache the result(s) of that part(s) after its first execution. Later, the result can be reused and combined with the result of the rest of the subquery that is changing for each iteration. This technique is applicable to arbitrary correlated subqueries.

Methods are introduced to recognize the invariant part of a data flow tree, and to restructure the evaluation plan to reuse the stored intermediate result. An efficient method is proposed to teach an existing join optimizer to understand the invariant feature and thus allow it to be able to generate better join plans in the new context. Some other related optimization techniques are also introduced. The proposed techniques were implemented using an existing real commercial database system.

An experimental evaluation of the proposed technique indicates that, when query rewriting is not possible, the invariant technique is significantly better than the traditional nested iteration method. Even when query rewriting applies, the invariant technique is sometimes better than the query rewriting technique. Thus, the invariant technique is advantageous as an alternative in evaluating correlated queries since it fills the gap left by rewriting techniques.

BRIEF DESCRIPTION OF THE DRAWINGS

FIG. 3A is a block diagram illustrating use of a subquery.

FIG. 5 is a source code listing illustrating an open method of the present invention.

FIG. 6 is a source code listing illustrating a next method of the present invention.

FIG. 7 is a diagram illustrating plans for a correlated subquery in an example query.

FIG. 10 illustrates rewriting of the query.

FIG. 13 displays two graphs illustrating the results for another example query (query2).

DETAILED DESCRIPTION OF A PREFERRED EMBODIMENT

The following description will focus on the presently preferred embodiment of the present invention, which is operative in a network environment executing client/server database applications. The present invention, however, is not limited to any particular application or environment. Instead, those skilled in the art will find that the present invention may be advantageously applied to any application or environment where optimization of query performance is desirable, including non-SQL database management systems and the like. The description of the exemplary embodiments which follows is, therefore, for the purpose of illustration and not limitation.

Standalone System Hardware

Figure 1A:
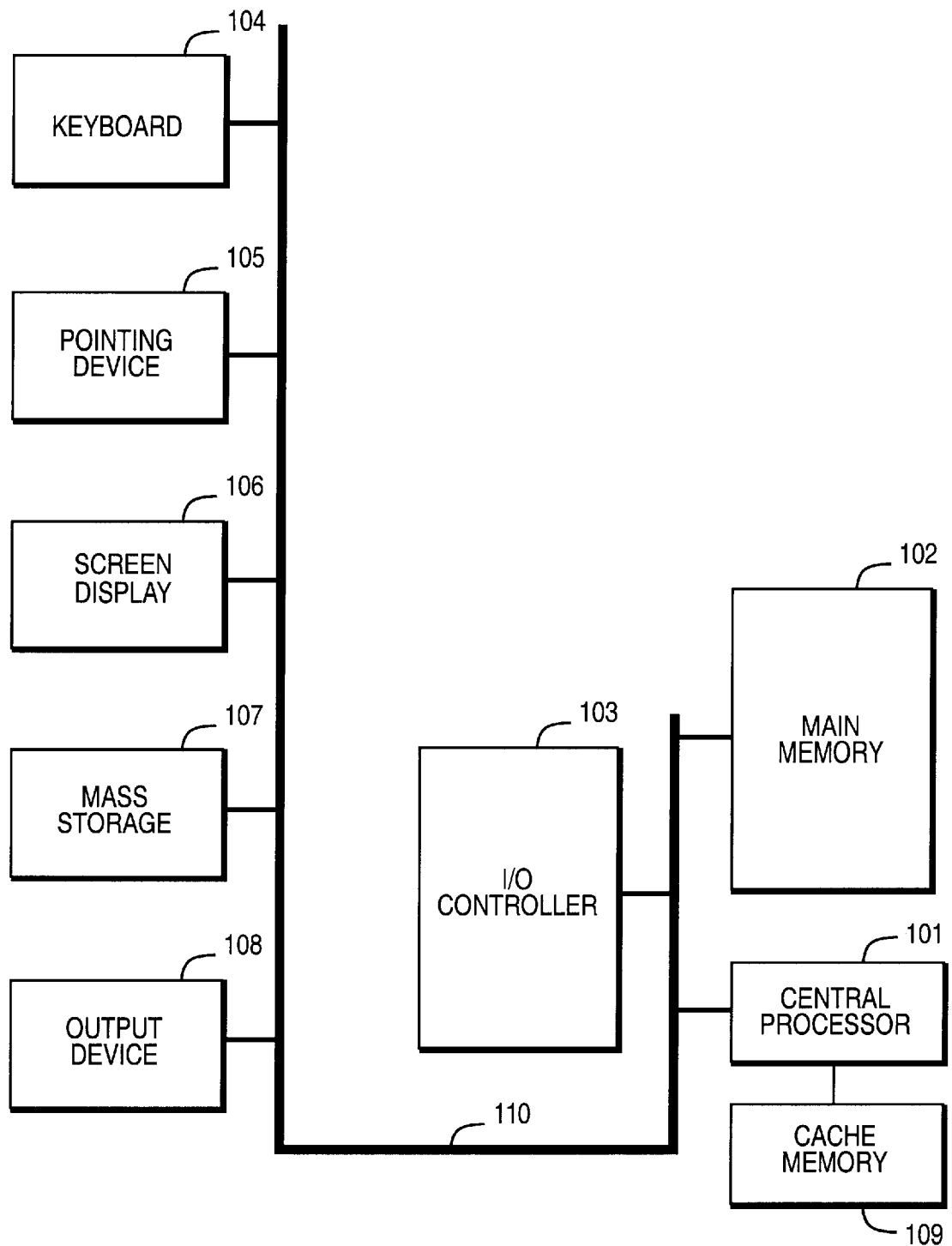
FIG. 1A is a block diagram illustrating a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a mass storage 107 (e.g., hard or fixed disk, removable disk, optical disk, magneto-optical disk, or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Standalone System Software

Figure 1B:
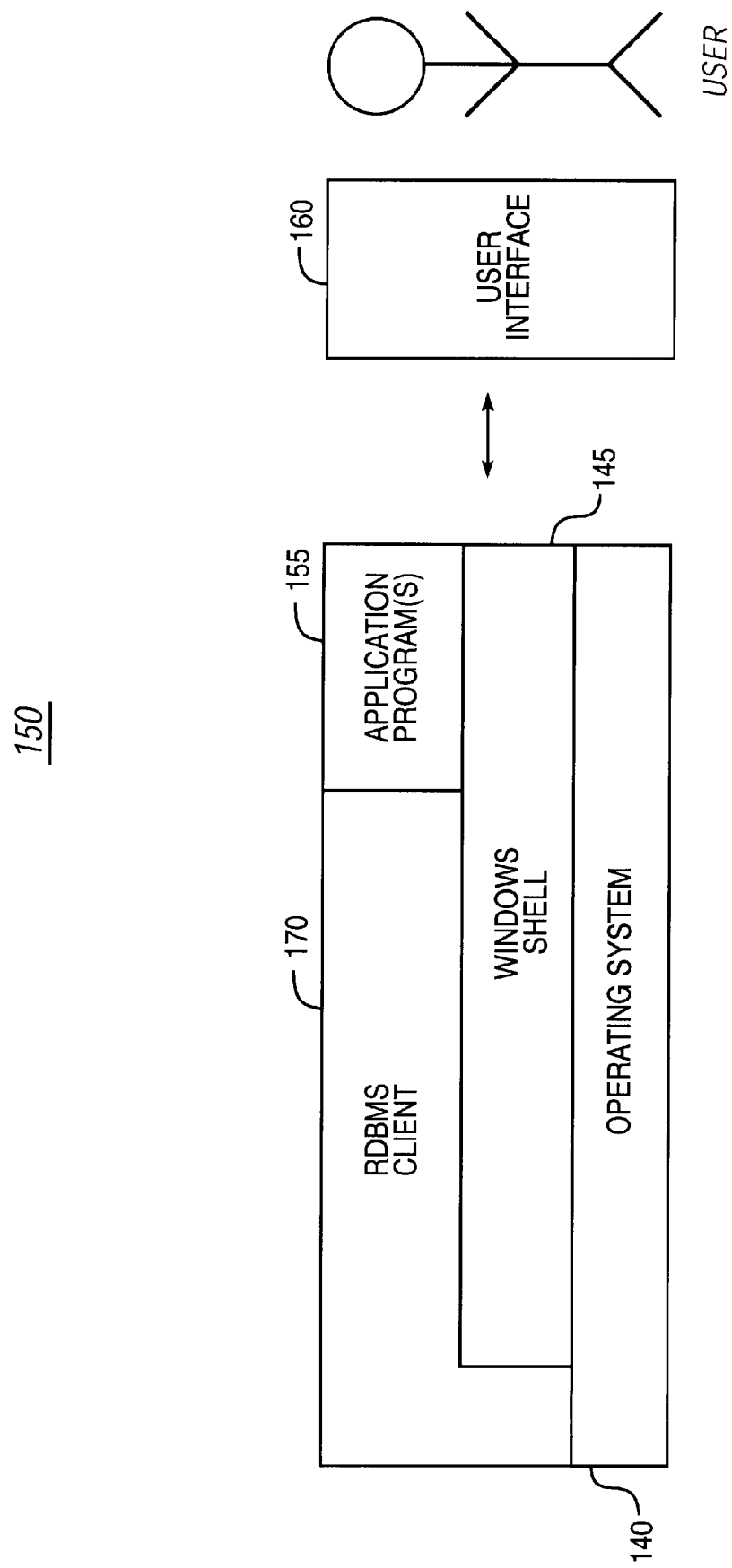
FIG. 1B is a block diagram illustrating a software sub-system for controlling the operation of the computer system of FIG. 1A.

Illustrated in FIG. 1B, a computer software system 150 is provided for directing the operation of the computer system 100. Software system 150, which is stored in system memory 102 and on mass storage or disk memory 107, includes a kernel or operating system (OS) 140 and a windows shell 145. One or more application programs, such as application software 155, may be "loaded" (i.e., transferred from storage 107 into memory 102) for execution by the system 100. The system also includes a user interface 160 for receiving user commands and data as input and displaying result data as output.

Also shown, the software system 150 includes a Relational Database Management System (RDBMS) front-end or "client" 170. The RDBMS client 170 may be any one of a number of database front-ends, including PowerBuilder™, dBASE®, Paradox®, Microsoft® Access, or the like. In an exemplary embodiment, the front-end will include SQL access drivers (e.g., Borland SQL Links, Microsoft ODBC drivers, Intersolv ODBC drivers, and the like) for accessing SQL database server tables in a Client/Server environment.

Client/Server Database Management System

Figure 2:
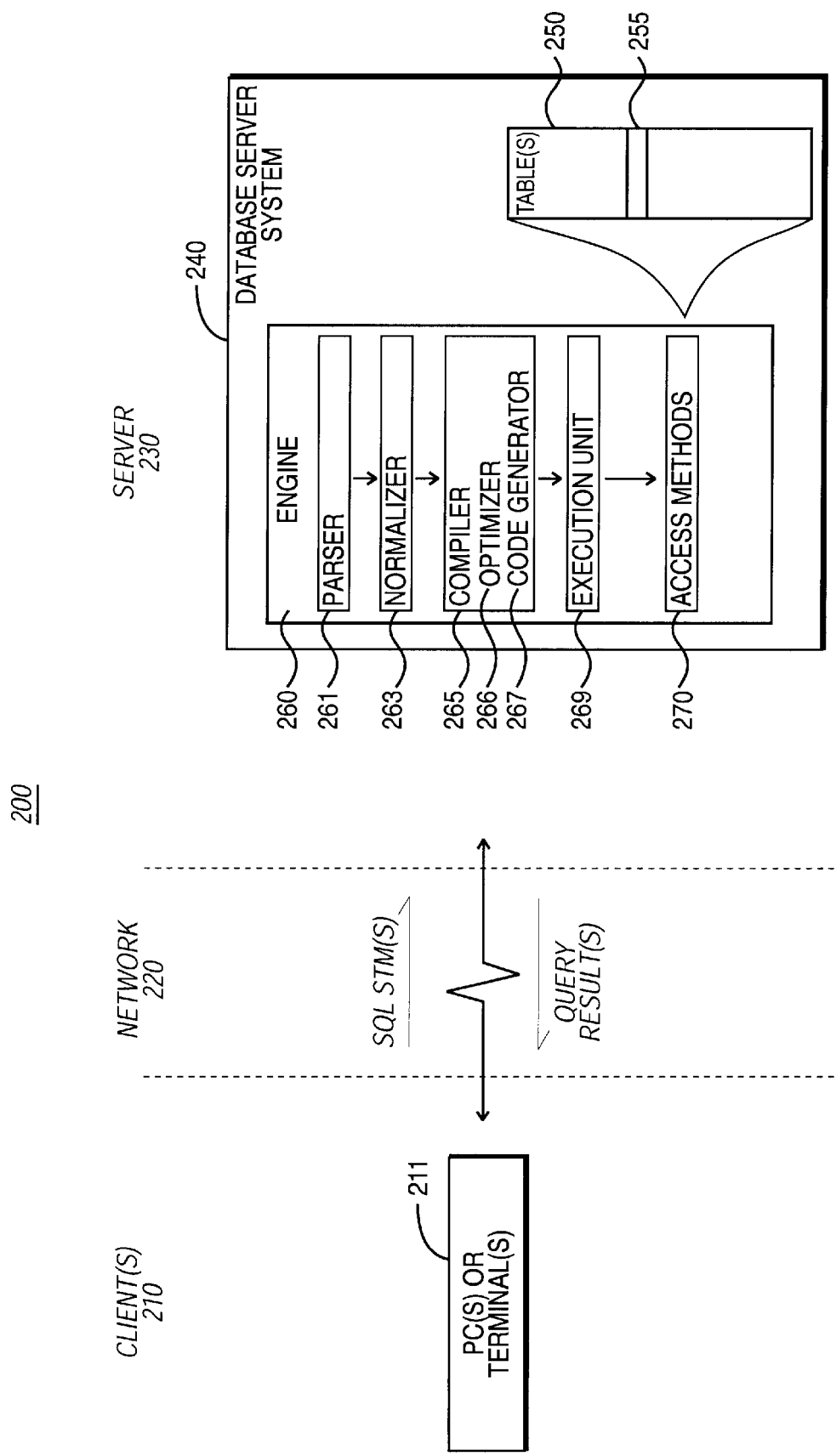
FIG. 2 is a block diagram of a client/server system in which the present invention is preferably embodied.

While the present invention may operate within a single (standalone) computer (e.g., system 100 of FIG. 1A), the present invention is preferably embodied in a multi-user computer system, such as a Client/Server system. FIG. 2 illustrates the general structure of a Client/Server Database System 200 suitable for implementing the present invention. As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows/MS-DOS for PC clients.

The Database Server System 240, which comprises Sybase SQL Server™ (available from Sybase, Inc. of Emeryville, Calif.) in an exemplary embodiment, generally operates as an independent process (i.e., independently of the clients), running under a server operating system such as Microsoft Windows NT (Microsoft Corp. of Redmond, Wash.), NetWare (Novell of Provo, Utah), or UNIX (Novell). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client calls in the well-known SQL (Structured Query Language) together with any parameter information into a format (of one or more packets) suitable for transmission across a cable or wire, for delivery to the Database Server 240.

Client/server environments, database servers, and networks are well documented in the technical, trade, and patent literature. For a discussion of database servers and client/server environments generally and SQL Server™ particularly, see, e.g., Nath, A., *The Guide to SQL Server*, Second Edition, Addison-Wesley Publishing Company, 1995. Additional documentation of SQL Server™ is available from Sybase, Inc. as *SQL Server Documentation Set* (Catalog No. 49600). For a discussion of a computer network employing Microsoft Networks/OpenNet File Sharing Protocol, see, e.g., METHOD AND SYSTEM FOR OPPORTUNISTIC LOCKING IN A NETWORKED COMPUTER SYSTEM, Intl. Application No. PCT/US90/04570, Intl. Publication No. WO 91/03024, Intl. Publication Date Mar. 7, 1991. For a general introduction to a Local Area Network operating under NetWare, see, e.g., Freed, L. et al., *PC Magazine Guide to Using NetWare,* Ziff-Davis Press, 1991. A more detailed discussion is available in NetWare 3.x and 4.x and accompanying documentation, which is available from Novell of Provo, Utah. The disclosures of each of the foregoing are hereby incorporated by reference.

In operation, the Client(s) 210 store data in or retrieve data from one or more database tables 250, shown in FIG. 2. Typically resident on the Server 230, each table itself comprises one or more horizontal rows or "records" (tuples) together with vertical columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the Clients issue one or more SQL commands to the Server. SQL commands may specify, for instance, a query for retrieving particular data (i.e., data records meeting the query condition) from the table 250. The syntax of SQL (Structured Query Language) is well documented; see, e.g., the abovementioned *An Introduction to Database Systems.* In addition to retrieving the data from Database Server tables, the Clients also include the ability to insert new rows of data records into the table; Clients can also modify and/or delete existing records in the table.

For enhancing the speed in which the Database Server stores, retrieves, and presents particular data records, the Server maintains one or more database indexes on the table. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file.

In operation, the SQL statements received from the one or more Clients 210 (via network 220) are processed by Engine 260 of the Database Server System 240. The Engine 260 itself comprises a Parser 261, Normalizer 263, Compiler 265, Execution Unit 269, and Access Methods 270. Specifically, the SQL statements are passed to the Parser 261 which converts the statements into a query tree—a binary tree data structure which represents the components of the query in a format selected for the convenience of the system. In this regard, the Parser 261 employs conventional parsing methodology (e.g., recursive descent parsing).

The query tree is normalized by the Normalizer 263. Normalization includes, for example, the elimination of redundant data. Additionally, the Normalizer performs error checking, such as confirming that table names and column names which appear in the query are valid (e.g., are available and belong together). Finally, the Normalizer can also look up any referential integrity constraints which exist and add those to the query.

After normalization, the query tree is passed to the Compiler 265, which includes an Optimizer 266 and a Code Generator 267. The Optimizer is responsible for optimizing the query tree. The Optimizer performs a cost-based analysis for formulating a query execution plan. The Optimizer will, for instance, select the join order of tables (e.g., when working with more than one table); it will select relevant indexes (e.g., when indexes are available). The Optimizer, therefore, performs an analysis of the query and picks the best execution plan, which in turn results in particular ones of the Access Methods being invoked during query execution.

The Code Generator, on the other hand, converts the query tree into a set of instructions suitable for satisfying the query. These instructions are passed to the Execution Unit 269. Operating under the control of these instructions, the Execution Unit 269 generates calls into lower-level routines, such as the Access Methods 270, for retrieving relevant information (e.g., row 255) from the database table 250. After the plan has been executed by the Execution Unit, the Server returns a query result or answer table back to the Client(s).

Of particular interest to the present invention is the optimization of query execution in the presence of one or more subqueries—queries embedded within other queries. Modification of the Engine 260 for achieving this optimization is described in further detail below.

Queries and Subqueries

It is helpful to review the nature of SQL queries. In SQL, a programming construct exists called a "subquery." A subquery may be thought of as a "query within a query" (i.e., a nested query). In some types of subqueries, the subquery references the outer query (i.e., the query in which the subquery is embedded within). This is perhaps best illustrated by way of example.

FIG. 3A illustrates diagrammatically such a situation. Consider two database tables, table T1 (shown at 310) and table T2 (shown at 320). Each table comprises two columns: columns C1 and C2 for table T1, and columns C3 and C4 for table T2. An example of a query having a subquery for the above two tables is shown at 330, as follows:

SELECT C1 FROM T1 WHERE
    C2=(SELECT MAX(C3) FROM T2 WHERE T2.C4=
    T1.C1)

Note, in particular, the subquery which occurs at 335, as follows:

SELECT MAX(C3) FROM T2 WHERE T2.C4=T1.C1

The query operates as follows. A query result is constructed such that values are selected from column C1 of T1 in the instance where column C2 is equal to the result of the subquery expression (335). Here, the value of column C1 from table T1 (i.e., T1.C1) is used in the subquery. In particular, the subquery specifies the selection of the maximum value from column C3 of table T2 but only for instances where the value of column C4 of table T2 (i.e., T2.C4) equals the value of column C1 of table T1 (i.e., T1.C1). When the subquery is evaluated on the tables, an answer is generated. The value to which the subquery resolves is then employed in the outer query (i.e., in the "WHERE" clause). For instances where C2 is equal to the subquery value, the value in column C1 of table T1 is selected into the query result. In operation, such a query is typically processed sequentially—that is, the query expression would be evaluated for the first row of T1, followed by the second row, and so forth and so on until all rows have been evaluated.

Since reducing the time required for processing queries improves system performance, it is highly desirable to optimize queries of the foregoing type. Without further optimization, processing of a query containing a subquery in real-time is particularly burdensome, especially since a relatively high number of computations (and possibly disk or network input/output operations) must be performed in order to evaluate each row of the table under examination. Moreover, the foregoing example has, for purposes of clarity of explanation, focused on a subquery having a single input value, namely T1.C1. In real-world applications, subqueries will often depend upon multiple input values and, thus, entail further performance penalties.

Optimizing Performance of Correlated Subqueries

1. Introduction

Correlated queries are those queries having subqueries which use references from outer query blocks. These references will be referred to as outer references. Correlated queries are very important because: a) decision support systems tend to use them heavily to express complex requests, and b) correlated queries are often automatically generated by many application generators that translate queries from their native languages into standard SQL. In the TPC-D decision support benchmark (see, e.g., Tpc-d benchmark standard specification (revision 1.0), May 1995), for instance, there are three correlated queries among the seventeen queries.

Traditionally, the processing of correlated queries is usually done in a nested iteration fashion. All the rows from the outer query block are fetched one by one. For each of the rows fetched, the outer references in the subquery are then evaluated and the result is returned. After that, those predicates containing correlated subqueries (referred to as nested predicates) will be evaluated. The whole process is repeated until all the rows have been exhausted from the outer query block. Since the whole subquery has to be executed from scratch multiple times, this strategy can be very time consuming.

To overcome this problem, query "decorrelation" has been studied and proposed as a better solution. The basic idea is to rewrite a correlated query in such a way that outer references no longer exist. In Seshadri et al. (see, e.g., Praveen Seshadri, Hamid Pirahesh, and T. Y. Cli Leung, *Complex query decorrelation*, In Proc. IEEE Int'l Conf. on Data Eng., pages 450–458, 1996), a technique is proposed that will extract all the distinct values of outer references and materialize all the possible results from the subquery. Later, the materialized results are joined with the outer query block on the outer reference values. Although the rewritten query usually introduces extra views, joins and possibly group-bys, much better performance can still be expected since now the subquery only needs to be executed once. This is especially true when the number of iterations of the subquery is large.

Figure 3B:
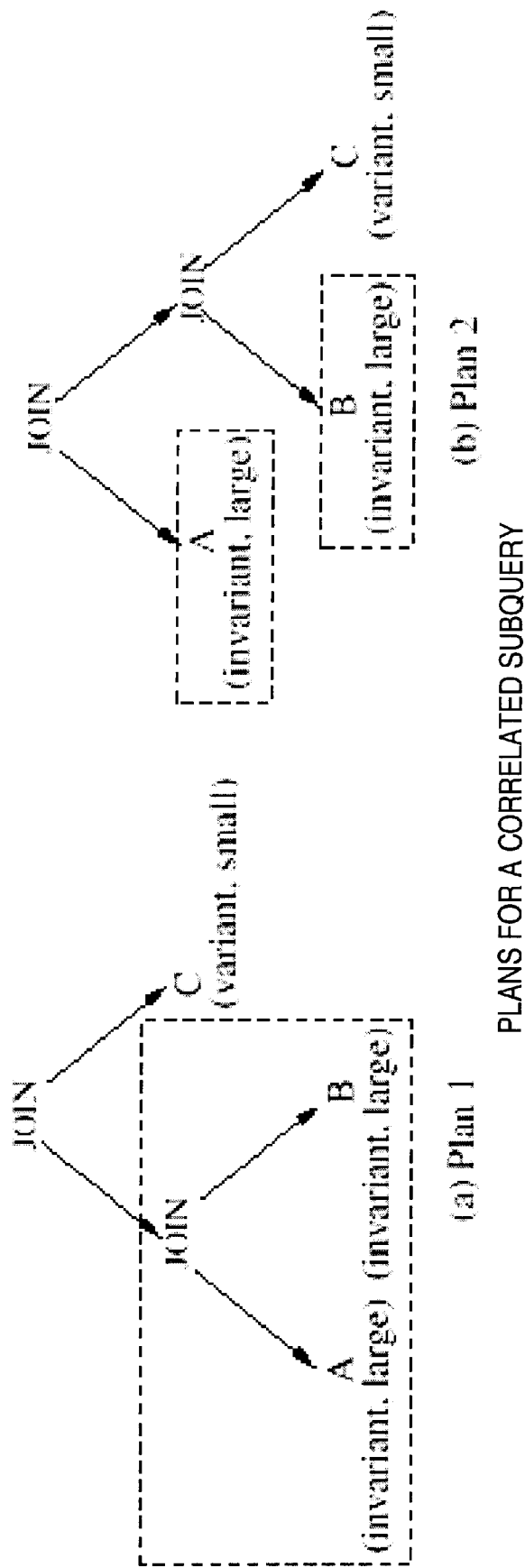
FIG. 3B is a diagram illustrating plans for a correlated subquery.

One problem with the rewriting strategy is that query decorrelation is not always possible and in some cases, although possible, may not be efficient. As illustrated in FIG. 3B and pointed out by Pirahesh et al. (see, e.g., Hamid Pirahesh, Joseph M. Hellerstein, and Waqar Hasan, *Extensible/rule based query rewrite optimization in startburst*, In Proceedings of the ACM SIGMOD Conference, pages 39–38, 1992), "Queries that contain non-existential or non-Boolean factor subqueries, set operators, aggregates, or user-defined extension operators (such as OUTER JOIN)" do not get rewritten. Although later work by Seshadri et al. shows that some of the queries including aggregates can be decorrelated, there are still many queries which should not be rewritten for either semantic or implementation reasons. For example, correlated queries with nested predicates using a non-inclusion operator (NOT IN) are almost impossible to rewrite unless new types of operators are introduced as specified by Kim (see, e.g., Won Kim, *ON optimizing an SQL-like nested, query*, ACM Transactions on Database Systems, 7(3): pages 443–469, 1982). Another example is that an OUTER JOIN may be introduced in some query rewriting transformations. But this may not be desirable for systems that do not support OUTER JOIN directly. Examples of several types of queries that have no existing ways (without introducing new operators) of being rewritten are illustrated by the following Table 1.

TABLE 1

Non-rewritable Correlated Queries

Correlated queries that have no known ways of being rewritten without introducing new internal operators:

1. Nested predicate involves negation.

| SELECT | $R_i \cdot C_k$ | | |
|---|---|---|---|
| FROM | $R_i$ | | |
| WHERE | $R_i \cdot C_h$ NOT IN | (SELECT | $R_j \cdot C_m$ |
| | | FROM | $R_j$ |
| | | WHERE | $R_i \cdot C_n = R_j \cdot C_p$) |

2. Nested predicate involves All.

| SELECT | $R_i \cdot C_k$ | | |
|---|---|---|---|
| FROM | $R_i$ | | |
| WHERE | $R_i \cdot C_h$ <> ALL | (SELECT | $R_j \cdot C_m$ |
| | | FROM | $R_j$ |
| | | WHERE | $R_i \cdot C_n = R_j \cdot C_p$) |

3. Nested predicate involves set predicates.

| SELECT | $R_i \cdot C_k$ | |
|---|---|---|
| FROM | $R_i$ | |
| WHERE | (SELECT | $R_j \cdot C_h$ |
| | FROM | $R_j$ |
| | WHERE | $R_i \cdot C_n = R_j \cdot C_p$) |
| | CONTAINS | |
| | (SELECT | $R_k \cdot C_m$ |
| | FROM | $R_i$) |

Based on an estimation from the development team for Sybase SQL Anywhere (Sybase, Inc. of Emeryville, Calif.), around 40% of real world correlated queries cannot be rewritten. The queries for which query rewriting fails usually involve very complex subqueries, which can be very time-consuming if executed in the traditional nested iteration fashion. Therefore, a better solution is sought.

One observation is that although a correlated subquery can get quite complex, usually the outer references are bound to just one or two tables in the subquery. It is the correlated part of the subquery that may change its value and thus needs to be executed multiple times. The remaining part, which is in fact uncorrelated, is not affected by the changing of values of the outer references. This leads to caching the results of the uncorrelated part after it has been executed for the first time. The cached result can be reused in subsequent executions and combined with the new results from the correlated part (which has to be regenerated). The uncorrelated part is then called invariant and the correlated part variant. FIG. 3B illustrates a possible correlated subquery plan, at (a). The invariant part is enclosed in the dashed box. The join between table A and table B only needs to be executed once and the join between the cached intermediate result and table C can be performed in subsequent executions of the subquery.

A join optimizer that does not consider the invariant feature may actually choose a different join plan (FIG. 3B at (b)) for the subquery since table C is small. But here there are two smaller invariant parts instead of one large part. That means two joins have to be performed for each outer query iteration. If the number of iterations is large, the overall cost for plan 2 may be more expensive than that of plan 1. An easy way to let the join optimizer choose an overall optimal plan taking invariants into consideration is sought.

The technique of caching the invariant result and later reusing it will be referred to as the invariant technique. By reducing the amount of work that has to be done for each iteration, it is expected that the invariant technique will give better performance for those queries that cannot be rewritten. For those queries where both rewriting and invariant techniques are applicable, some experimental and analytical comparisons have been done between the two. The conclusion is that the rewriting technique is not always advantageous.

This technique also works when the outer reference takes the form of host variables (variables coming from the client program), or bind variables (variables generated internally). Without loss of generality, the discussion here will focus only on outer references. It should be noted that this technique differs from the traditional memoization (i.e., memo-based) method (see, e.g., Donald Michie, "*Memo" functions and machine learning,* Nature, 218: pages 19–22, 1968), which only helps when there are duplicates in the outer references. The invariant technique is useful whether there are duplicates or not, although additional benefits can be realized from memoization when there are duplicates in the outer references.

The discussion will be based on the Volcano style query execution engine (see, e.g., Goetz Graefe, *Volcano, an extensible and parallel query evaluation system,* IEEE Transactions on knowledge and data engineering, 6(6): pages 934–944, 1994), in which each query plan is a tree of operators. All operators are implemented as iterators and support a simple open-next-close interface, where open( ) does most of the preparation work, next( ) fetches the rows one by one and close( ) cleans up everything. Most relational database systems have analogous operator-based execution engines. This type of query engine is called a data flow engine and the execution plan is called a data flow tree.

The rest of this application is organized as follows: Section 2 describes the approach or methodology of marking each node in the data flow tree as variant or invariant. Section 3 introduces the method of caching and reusing the invariant results. Section 4 describes the techniques of incorporating the invariant information into an existing join optimizer. Some post optimization techniques are also proposed. Section 5 summarizes how everything can be put together. Section 6 shows the experimental results and analysis comparing the invariant technique and the rewriting technique. It is also pointed out that the amount of available RAM plays an important role in correlated query evaluation. Conclusions are presented in Section 7.

2. Finding the Invariant Subplan

Figure 4:
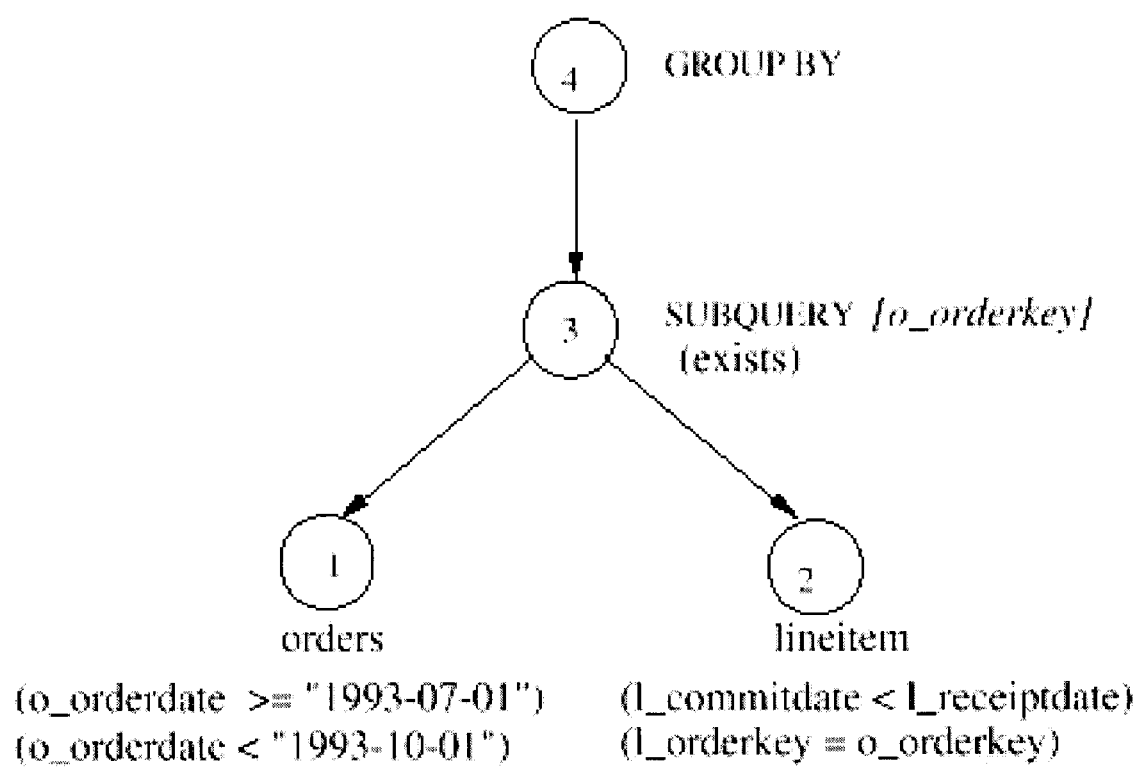
FIG. 4 is a diagram illustrating an example of a correlated query and its corresponding data flow tree.

The Volcano execution engine paper did not describe any particular implementation of a subquery. Here, Sybase IQ's approach is chosen. (However, the idea presented here could be adapted to other implementations.) It is assumed that a subquery will be implemented through a subquery node (operator) in a data flow tree. The left child of the subquery node corresponds to the outer query block while the right child corresponds to the inner query block, i.e., the subquery. If the corresponding subquery is correlated, an outer reference vector will be generated in the subquery node. The nested predicate is also put in the subquery node for later evaluation. An example of a correlated query and its corresponding data flow tree is shown in Example 2.1 and FIG. 4 respectively. Predicates are pushed down in the tree as deep as possible (listed in parentheses). The outer reference vector is represented in italic font. When evaluating a subquery node, next( ) will first be called on its left child to get one row. Then the values of the outer reference are bound to all their occurrences in the right subtree and next( ) will be called on the right child to retrieve the result from the subquery. The whole process is repeated for all the iterations. For nested queries of level two or more, there will be more than one subquery node in the data flow tree. Outer references are usually referred to in a predicate or the output vector in a particular data flow node. It is also assumed that there will be typical data flow nodes such as table scan node, join node, filter node and group-by node.

Example 2.1
select o_orderpriority,
   count(*) as order_count
from orders
where o_orderdate>="1993-07-01"
   and ol_orderdate<"1993-10-01"
   and exists (select *
    from lineitem
    where l_orderkey=o_orderkey
     and l_commitdate<l_receiptdate)
group by o_orderpriority A formal definition of an invariant subtree will now be given.

Definition 2.1: An invariant subtree in a data flow tree is a subtree T where none of the nodes in T contains any outer references that are generated outside of T.

As a general rule, a node in a data flow tree will be marked as invariant if all of its children are invariant and no outer references are referred to in the node itself. But caution should be exercised: notice that outer references are scoped in a data flow tree, i.e., they will be generated at a particular subquery node and are meaningful only to the subtree on the side that corresponds to the body of the subquery, hereafter refered to as the right subtree of the subquery node. A subtree can be invariant even though there is an outer reference being used within the subtree, as long as the outer reference does not refer outside the subtree. So, the outer references being used in the subtree rooted at each subquery node should be kept track of. If they are all generated at the root, i.e., a particular subquery node, then the subquery node should be marked as invariant since the subtree does not use any reference generated outside.

The method traverses the data flow tree in pre-order. An outer reference vector is passed along during the traversal. Every time a subquery node is reached, newly generated outer references are added to the vector before traversing the right subtree. Each node (except the subquery node) checks if any outer references in the vector is being used in the node locally or in one of its children. If so, the node will be marked as variant. Otherwise, the node is invariant. For the subquery node, a little bit more is done. All the occurrences of the outer references in its right subtree are checked to see whether they are generated in the subquery node itself. If such is the case, the subquery node is marked as an invariant. In the same traversal, each node is also marked according to whether it is in a correlated subquery or not. This information is useful because a data flow node will be executed more than once only if it is in a correlated subquery.

In cases where there is a multi-level correlated subquery, it might be the case that a node in a data flow tree uses only outer references generated in the query block two or more levels up (e.g., division-style queries). The node will be marked as variant by the above method. But in fact, for each inner subquery iteration, the result of that node remains the same. The result only changes when the outer references change in the outer iteration. What can be done is to store, for each outer reference in a subquery node, a list of nodes using that outer reference in a data flow tree. Then each node can be marked as invariant or not dynamically at preparation time during the execution. It is also possible, when a single subquery has more than one outer reference, to identify the specific nodes within that subquery that are variant with respect to changes in each of those outer references independently. Thus if a subquery had outer references, T1.X and T1.y, then nodes in the subquery could be marked as one of: invariant; variant with respect to T1.X; variant with respect to T1.Y; or variant with respect to both T1.X and T1.y. In both of these potential extensions, it becomes possible to reuse some of the intermediate results that in the more simplistic model are merely marked as variant. However, either of these extensions would complicate the implementation and it is not clear how many real world queries can benefit from it. For these reasons, neither the extension for reference specific variance nor the extension for multi-level correlated queries have been implemented.

In some situations, there is one additional strategy that can be employed to maximize the invariant subtree. Normally all predicates are placed as low as semantically possible in the query tree to take advantage of their filtering effect as quickly as possible. Thus, a predicate like: LOCAL_TABLE.COL1=OUTER_REFERENCE_TABLE.COL1 would usually be attached to the data flow node for table LOCAL_TABLE. There are cases, however, where it is far more efficient to migrate outer reference predicates as high as semantically possible inside the subquery to maximize the invariant subtree, and thereby minimize the number of nodes that will have to be visited on each subsequent iteration of the subquery.

3. Reusing the Invariant Result

After it is known whether a data flow node is invariant or not and also whether it is in a correlated subquery or not, caching the invariant result allows that result to be reused in subsequent executions. The first thing to notice is that there may already exist some forms of storage in various types of data flow nodes. For example, in a hash join node, a hash table may be associated with it, which will typically be used to hash the smaller operand (the rows from the larger operand will be used to do the probing). Another example will be a group-by node, where a hash table or a sorting storage element may exist depending on the implementation. Normally, the existing storage element will be reset (the contents cleaned) during each open( ) call. But they can be changed to be capable of rewinding their contents. (By rewinding, the content of the storage can be retrieved from the very beginning again.) Each storage element has to be notified whether rewinding is indeed necessary at preparation time based on the invariant feature. The reason why it is desirable to distinguish a rewindable storage element from an unrewindable one is that the implementation without the need for rewinding may have some benefit, such as being able to release some of the resource (memory) allocated after partial retrieval. So it is desirable to only rewind an existing storage element when it is beneficial. It is assumed that this can be achieved by calling a SetExpectRewind( ) function on the storage element. If there is no existing storage element associated with an invariant data flow node such as a filter node, a new one may want to be added. There are various ways of doing this. In the preferred implementation, a new type of data flow node can be simply designed, namely a storage node, which also supports the open-next-close interface. Its only functionality is to retrieve all the rows from its (only) child and save the result internally. Later, all the rows can be retrieved from the storage node without having to execute the subtree below it. However, the adding of a storage node should be done on a cost basis. In the case of a Cartesian product or a many-to-many join in the subtree, the cost of retrieving the result may be higher than reexecuting the subtree. If so, the result is preferably not cached.

To reuse the existing storage element, there are two main places that need to be modified. The first is in the open( ) function of all the data flow nodes with existing storage elements. These storage elements need to be set correctly as to whether they are expected to be rewound. The second place is in the next( ) function. If there is an existing storage element and it is reusable, the next row should be gotten directly from the storage element without calling next( ) on its children. The original functions need to be adapted to meet this requirement. Method 3.1 and Method 3.2 describe the changes in open( ) and next( ).

Method 3.1: Adjusted open( ) function (FIG. 5).
Method 3.2: Adjusted next( ) function (FIG. 6).

The method for adding a storage node in the data flow tree is presented in Method 3.3. The idea is to traverse through the data flow tree from the root. As soon as a node marked as invariant and in a subquery is reached, it is checked whether there is an existing storage element associated with it. If so, the task is done (actually almost done). Otherwise, a storage node may be inserted above it if that is more cost-effective than reexecuting the node. Since the tree is being traversed top-down, a storage node will only be inserted above a maximal invariant subtree (i.e., no storage node will be added above any of its invariant children).

Method 3.3: Method for adding a storage node in the data flow tree.

```
void AddStorageNode (df_node nd) {
    if (nd is not in a correlated subquery OR nd is a variant)
        for each child_i of nd
            Call AddStorageNode (child_i).
    else { // now nd is in a subquery and is an invariant
        if (there is an existing storage element with nd)
            Call MarkSubtree (nd).
        else
            if ((ECost(nd) + ICost(nd) + (n-1) * RCost(nd))/n
                < ECost(nd)) {
                Insert a storage node above nd.
                Call MarkSubtree(nd).
            }
    }
}
```

In Method 3.3, RCost and ECost represent retrieving cost and execution cost respectively. RCost could be zero when a storage element can fit into memory. ICost is the cost of inserting all the rows to the new storage element and n is the number of iterations for the subquery. (See Section 4 for a discussion of the cost formula.) After a new storage node is inserted or it is detected that there is an existing storage element in a node, a function MarkSubtree( ) is called. This is because the subtree below the node will be executed only once. The storage associated with those nodes in the subtree should be treated as not expecting rewinding. This is exactly what MarkSubtree( ) does. It traverses the subtree and marks all the data flow nodes. Those nodes can simply be marked as not in a subquery. Alternatively, one can use another identifier and check it in open( ) and next( ) when deciding whether a storage element should expect rewinding or not.

4. Adapting an Existing Join Optimizer

By the time the data flow tree has been generated after various optimization techniques have been applied, the execution plan is fixed. Since the data flow tree is generated by the original join optimizer which does not take invariants into consideration, it is very likely that the maximal invariant subplan possible will not be gotten. As seen in FIG. 3, plan 2 which has a smaller invariant part may actually be chosen. This plan will be the most efficient if executed only once, but is suboptimal if executed multiple times, since the result of part of the plan can be cached. So it is important to find a way to teach the join optimizer to take the invariant feature into consideration when choosing the join orders. There are two goals here. The first is to find the optimal plan. The second is to make the adaptations of the original optimizer convenient.

On first thought, consideration may be given to dividing all the participating tables into two parts, one invariant and one variant. And then use the original join optimizer to find the optimal join orders on both parts and combine them by introducing another join between the two parts. In this way, it seems that the largest invariant subplan possible is obtainable. But actually this strategy has two pitfalls. First, it is not guaranteed to find the optimal join plan. This is because, in cases where there is no join predicate linking some tables within each part but there are join predicates linking those tables across the two parts, what may be introduced is a Cartesian product on both the invariant part and the variant part. Second, this requires non-trivial changes to the original join optimizer, which is the last thing that should be done.

Given that queries are becoming more and more complex, especially in decision support systems, most join optimizers in commercial database systems use cost-based searching techniques to try to find the optimal join orders. (It is assumed the join optimizer will be invoked on each query block separately.) A new strategy is to adjust the cost estimation in the join optimizer. Observe that the cost of an invariant subplan is, for the first execution, the cost of executing the subplan and storing it (if a new storage node has to be inserted), and for subsequent executions, the cost of retrieving all the rows from the cache. So if it is known that an invariant subplan is in a correlated subquery, the average cost of the subplan, i.e., $ACost=(ECost+ICost+(n-1)*RCost)/n$, can (and should) be used where n is the number of times the subplan will be executed and ACost, ECost, ICost, RCost represent Average Cost, Execution Cost, Cost of insertion into the new storage element and Retrieving Cost respectively. (Ideally, the estimation of those costs should take into consideration the amount of memory available.) ICost will be zero if there is an existing storage element associated with the subplan since the inserting cost is now included in the execution cost. ECost, ICost and RCost can easily be estimated using conventional techniques. A description of how n can be estimated is discussed in Section 5.

Notice that it is important to consider the maximal invariant subplan. If an invariant subplan is part of another larger invariant plan, since the smaller subplan will only be executed once (it is the result of the larger invariant plan that will be cached), it is preferable to use its execution cost as the cost of the subplan. This can be achieved by using the average cost for an invariant subplan only when it is going to be merged into a larger variant subplan. (In the formula above, if $(ECost+ICost-RCost)/n<<RCost$, the expression can be reduced to RCost.)

What is nice about this new strategy is that it solves both problems encountered before. It is optimal in some cases (as will be discussed below) and only minor changes are needed to incorporate it into an existing join optimizer. Method 4.1 shows how to adjust the join cost when building up a join tree in a join optimizer.

Method 4.1: Estimate Join Cost

Input: Two subplans subplan1 and subplan2, their associated costs cost1 and cost2, their cardinalities size1 and size2 and the number of iterations of the subquery n.

Output: The combined plan, its cost and cardinality.

Method: Decide the optimal join method to combine the two parts. Estimate ICost1 and ICost2 for each part based on the join method chosen.

```
if (the combined plan is variant) {
    if (subplan1 is invariant)
        Let cost1 be the smaller of cost1 and
        (cost1 + ICost1 + (n–1) * RCost(size1))/n.
    if (subplan2 is invariant)
        Let cost2 be the smaller of cost2 and
        (Cost2 + ICost2 + (n–1) * RCost(size2))/n.
}
else
    cost1, cost2 remain unchanged.
Use the new values of cost1 and cost2 to estimate the cost of the combined
plan.
Output the cardinality as before.
```

Pruning is heavily used in commercial join optimizers to narrow the search space. But it is important to be more careful about pruning in the adjusted join optimizer. For example, a simple pruning rule can be "if the cost of a subplan is greater than the best cost achieved so far, that subplan is ignored." If that subplan happens to be invariant, since it has not been merged with a variant part, its cost is still the execution cost. If this cost is used to do the pruning, a better plan may be missed because when the invariant subplan is eventually being merged into a variant plan, the average cost (if smaller) could be used. One way to solve the problem is to always keep invariant subplans, i.e., without pruning at all. Alternatively, the smaller of the average cost and the execution cost can be used to do the pruning, a technique called conservative pruning. This means that less pruning may be done than before and thus increase the optimization time. But this overhead only occurs in correlated subquery optimization. For outer query blocks and uncorrelated subqueries, the optimization cost remains the same. Given the fact that it can be done significantly better (as shown in the experiments later) by using the invariant technique, the extra optimization time is unlikely to be a problem. (In the experiments, the increase in optimization time can hardly be noticed, which is dominated by the execution time of the query.)

Observation 4.1: For correlated queries involving joins in the subquery, if the original join optimizer searches all possible join orders with the conservative pruning rule illustrated above and there is an exact estimation of n (the number of iterations), then the adjusted join optimizer will give the optimal join order with respect to the revised cost metric.

Reason: The optimal join cost can be multiplied by n. The optimal cost can then be divided into two parts, the term with a factor n and the term without such a factor. The term with a factor n corresponds to the cost of the variant part of the join plan and the term without n corresponds to the cost of the invariant part. Notice how the pruning technique was adjusted so that an invariant subplan will still be considered unless both its execution cost and retrieving cost are very high. So consideration will be given to all possible combinations of join orders that may be lead to the optimal plan. Further, the total cost estimation of each plan is exactly the cost when the plan will be executed using the invariant technique. So it will be guaranteed that the final join plan is the best plan that can be chosen.

There is another possible optimization technique which is orthogonal to the invariant optimization. Invoking the subquery on duplicate outer reference values can be avoided by using the subquery memoization technique (see, e.g., Donald Michie above), which has already been implemented in several commercial systems (e.g., Sybase IQ and Sybase SQL Anywhere, from Sybase, Inc. of Emeryville, Calif.). There are two possible ways to do that. The first is to build a main-memory hash table on the subquery node. Every time a subquery is executed, insert the values of the outer references for that iteration and insert the corresponding subquery result into the hash table. For subsequent executions of the subquery, the hash table is first probed based on the values of the outer references. If the probe succeeds, the cached result can be reused instead of reexecuting the subquery. Recently, a new hybrid cache method has been suggested by Hellerstein et al. (see, e.g., Joseph M. Hellerstein and Jerey F. Naughton, *Query execution techniques for caching expensive methods,* In Proceedings of the ACM SIGMOD Conference, pages 423–433, 1996) to avoid hash table thrashing. The second approach, described by Selinger et al. (see, e.g., Patricia G. Selinger, Morton M. Astrahan, Donald D. Chamberlin, Raymond A. Lorie, and Thomsa G. Price, *Access path selection in a relational database management system,* In Proceedings of the ACM SIGMOD Conference, pages 23–34, 1979), is to presort all the rows from the outer query block on the outer references before executing the subquery. Then in the subquery node, the result of the last execution of the subquery is simply cached. Since outer references are bound in sorted order, the cached result can be used whenever the outer reference values are repeated. Both methods have some overhead. The first one needs to build a hash table and the second one needs to presort some rows. But if the number of duplicated values is large enough, this overhead will be compensated for by the saving in the number of reexecutions of the subquery. In practice, the second approach is chosen. The presorting was implemented by adding above the left subtree of a subquery node an order-by node, whose only functionality is to retrieve all the rows from its child and sort them on designated keys (outer reference). A heuristic rule is used to determine when to add an order-by node. The rule simply calculates the ratio of the number of rows from the outer query and the number of possible distinct values of the outer references. If the ratio exceeds a threshold, the order-by node is added. The join optimizer should also take the above technique into consideration. In cases when it is desirable to presort the outer references, the average cost should now be min((ECost+ICost+(n'−1)*RCost)/n', ECost), where n' is the number of distinct values in the outer references.

Other post optimization techniques related to invariant subplans still exist. One of them is that when doing a hash join, it is more efficient to build the hash table on the invariant operand even though its size may be larger than the variant operand (assuming the invariant operand can still fit into memory). The reason is that now the hash table only needs to be built once.

5. Query Processing Using the Invariant Technique

This section will describe how everything can be put together. After a query has been parsed, it will be sent to a query optimizer which consists of the adjusted join optimizer. The query optimizer will generate the data flow tree for the query. The plan for correlated subqueries will be optimized with respect to the invariant feature using the technique described in Section 4. Then AddStorageNode( ) is called, as described in Section 3, on the root of the data flow tree to add necessary new storage elements. After that, all the nodes in the data flow tree are marked as variants or invariants using the method introduced in Section 2. Finally the data flow tree will be evaluated by calling the modified open( ) and next( ) on each data flow node. If a query is non-correlated, it will be handled as usual. So, by using the methods described in previous sections, an existing query optimizer and query execution engine can be adapted to incorporate the invariant technique without significant changes.

Usually the outer query block is optimized after the inner query block. Thus an important issue is how to get n, the number of iterations of a subquery before it is needed. In fact, what is needed is just the number of distinct values of the outer reference since outer reference sorting is used; the previous result may be cached when there are duplicates. Sybase IQ stores tables vertically and each column can be treated as an index. Local selection predicates in the outer query block are pushed down into base tables before the subquery is optimized. Thus, the exact number of distinct values can be obtained for an outer reference after filtering. This happens before the join order is optimized in the outer query block. Joins in the outer query block can only increase the derivations of the outer reference, but not the number of distinct values. When there is more than one outer reference in the same subquery, it may not be possible to have a very accurate estimation of the distinct count. But an upper bound can still be obtained in this situation.

6. Experiments and Performance Analysis

To verify the efficiency of the invariant technique, experiments have been done on different kinds of queries. This section will compare the performance of the original nested iteration implementation (without considering invariants), the invariant technique, and query rewriting, which are called NL, NLI and QR respectively. The query rewriting technique introduced by Seshadri et al. is used since it gives better performance than other rewriting techniques in most cases. The machine used was a dedicated Ultra Sparc II machine (200 MHz and 128 M of RAM), running SunOS Release 5.5.1. One disk was used to hold the databases, another for Sybase IQ's binaries, and a third was used for paging. The experiments were run on TPC-D (see Tpc-d benchmark above) databases at scale factor 1 and 10 with size of 1 GB and 10 GB respectively. (To save space, only those tables needed in the experiment were populated.) Also utilized was the improved Sybase IQ version 11.2.1 for all the tests (with invariant techniques turned on and off). The cost measured is the query response time (scaled within the range of [0 . . . 1]). The needed data set can fit into memory at scale factor 1 but cannot be totally held in memory at scale factor 10. The impact of memory size will be discussed below. The discussion here will be based on the following two queries and their variations.

Query 1: This is a TPC-D query that lists those suppliers that offer the desired type and size of parts in a particular region at the minimum cost.

select s_acctbal, s_name, n_name, p_partkey, p_mfgr,
　　S_address, s_phone, s_comment
from part, supplier, partsupp, nation, region
where p_partkey=ps_partkey
　　and s_suppkey=ps_suppkey
　　and p_size=15

```
and p_type like "%BRASS%"
and s_nationkey=n_nationkey
and n_regionkey=r_regionkey
and r_name="EUROPE"
and ps_supplycost=(select min(ps_supplycost)
    from partsupp, supplier, nation, region
    where p_partkey=ps_partkey
    and s_suppkey=ps_suppkey
    and s_nationkey=n_nationkey
    and n_regionkey=r_regionkey
    and r_name="EUROPE")
order by s_acctbal desc, n_name, s_name, p_partkey
```

Query 2: This query lists those parts with available quantity less than 2,000 whose cost is equal to some cost of the same part offered by any country except one.

```
select ps_partkey, ps_availqty
from partsupp ps
where ps_partkey<=[partkey]
    and ps_availqty<2000
    and ps_supplycost in (select ps_supplycost
        from partsupp, supplier
        where ps.ps_partkey=ps_partkey
            and s_suppkey=ps_suppkey
            and s_nationkey<>13)
order by ps_availqty
```

Both Query 1 and Query 2 are correlated queries. The outer references are p_partkey in Query 1 and ps.ps_partkey in Query 2. Each column has a fast projection index, which is a compressed list of column values in TID order. Every key column has a high non-group index, which consists of a traditional B+ tree and a Bit-Sliced index described by O'Neil et al. (see, e.g., Patrick O'Neil and Dallan Quas, *Improved query performance with variant indexes,* In Proceedings of the ACM SIGMOD Conference, pages 38–49, 1997). There is also a high non-group index on ps.availqty. Other columns in the local selection predicates have low fast indexes on them. A low fast index is basically a Bitmap index.

Figure 8:
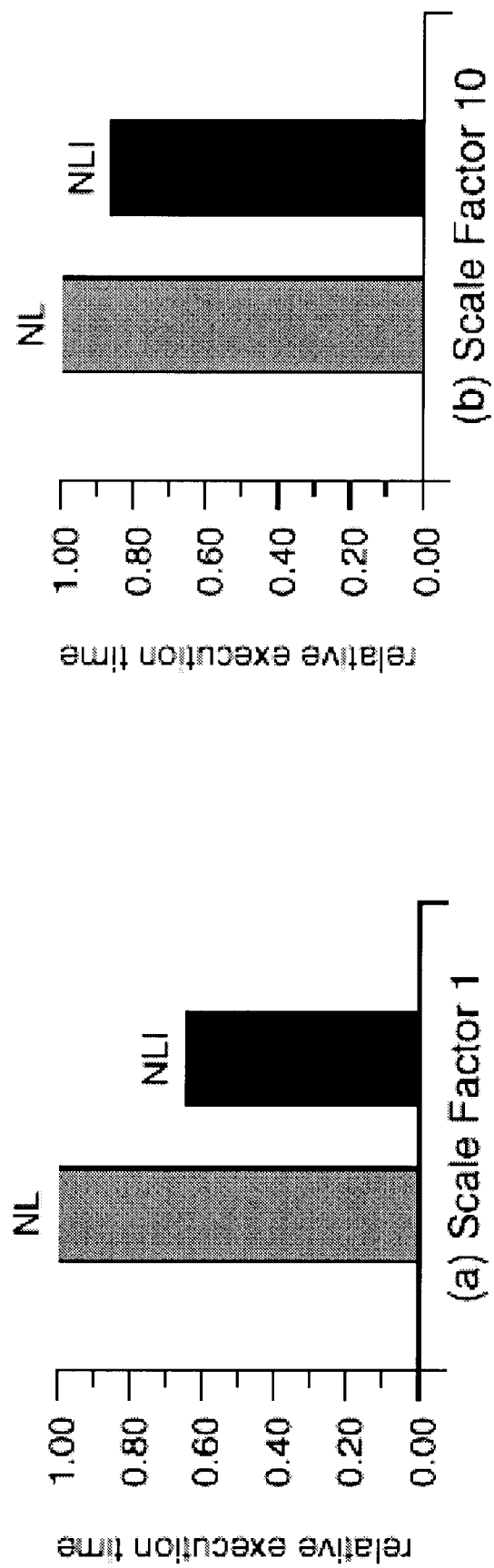
FIG. 8 displays two graphs illustrating the results for the query of FIG. 7.

The first experiment was done on Query 1(a), which is derived by changing the nested predicate in Query 1 to ps_supplycost not in <SUBQUERY> and omitting the MIN in the SELECT clause of the subquery. This is a non-rewritable query. There is a four-way join in the correlated subquery. NL chooses a bushy join plan (FIG. 7(*a*)) while NLI chooses a left deep tree (FIG. 7(*b*)) which has a larger invariant part. Since no existing QR techniques are available for this query, only NL and NLI are being compared. The results are shown in FIG. 8. (At scale factor 1, there are 469 invocations of the subquery.) In both graphs, NLI gives better performance than NL. At scale factor 10, the data required is too large to fit into memory and thus causes thrashing when evaluating the variant part. The cost of evaluating the variant part becomes more significant in the total cost. So there is less improvement at scale factor 10 than at scale factor 1.

Figure 9:
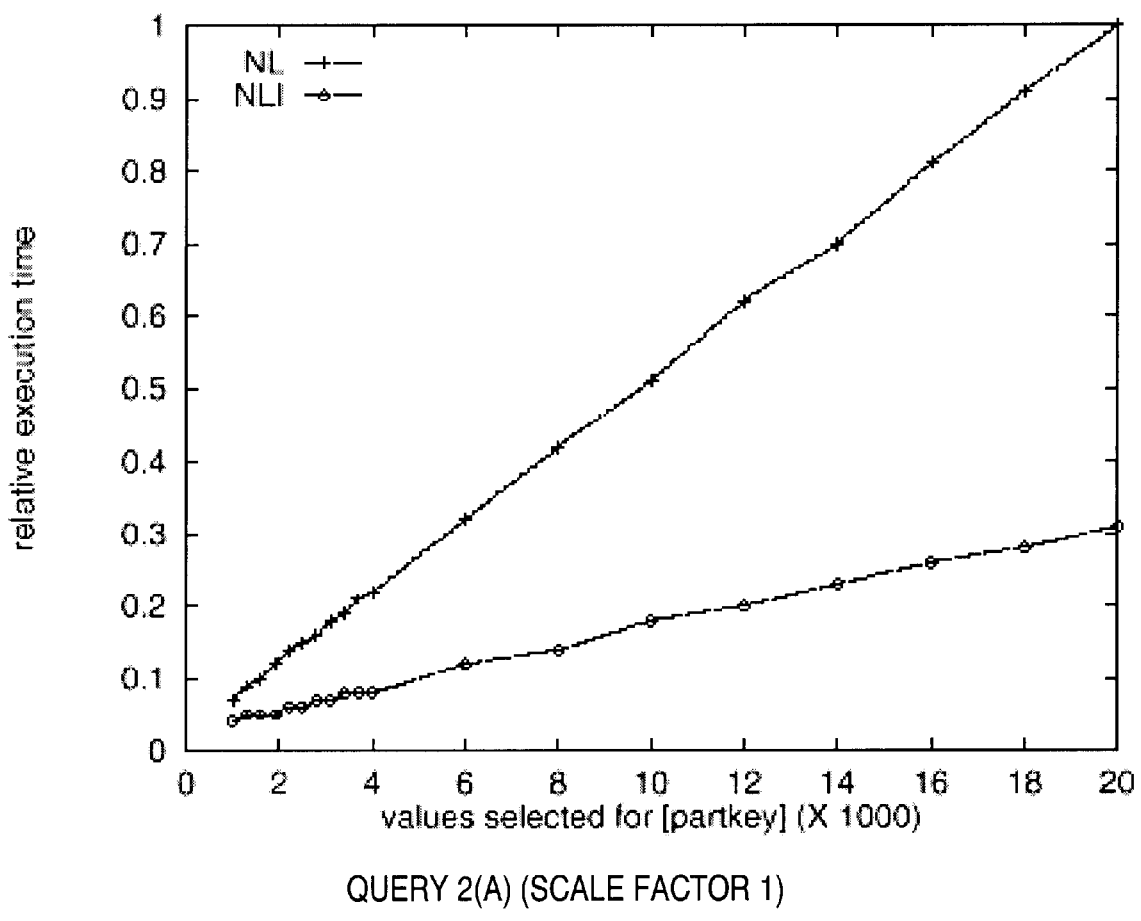
FIG. 9 displays a graph illustrating that the invariant technique of the present invention significantly improves system performance.

The second experiment was done on Query 2(a), which is designed by changing the nested predicate in Query 2 to ps_supply cost not in <SUBQUERY>. Again, this is a non-rewritable query. Different values were chosen for [partkey] within the range of ps_partkey. The predicate ps_availqty<2000 is used to reduce the number of duplicate outer reference values (ps_availqty ranges from 1 to 9,999). The result at scale factor 1 is shown in FIG. 9. Thus, the invariant technique significantly improves the performance across the board even though the invariant part contains only one table. Although not shown here, NL and NLI again choose different plans for the subquery. NLI will retrieve all the rows from supplier only once to build a hash table and probes will be performed on the in-memory hash table for all the iterations. NL, on the other hand, has to do table lookups on supplier for each iteration. So the larger the number of iterations, the worse its performance.

Now, a comparison is done of NLI with QR. The first test is done on Query 1. The syntax for the rewritten query is shown in FIG. 10. Notice that V0 is mentioned twice, once in evaluating V1 and once in evaluating the final query. V1 is pre-materialized in the tests to avoid V0 being reexecuted. Since the cost of writing V1 to disk was not counted, the setup favors QR a little bit.

Figure 11:
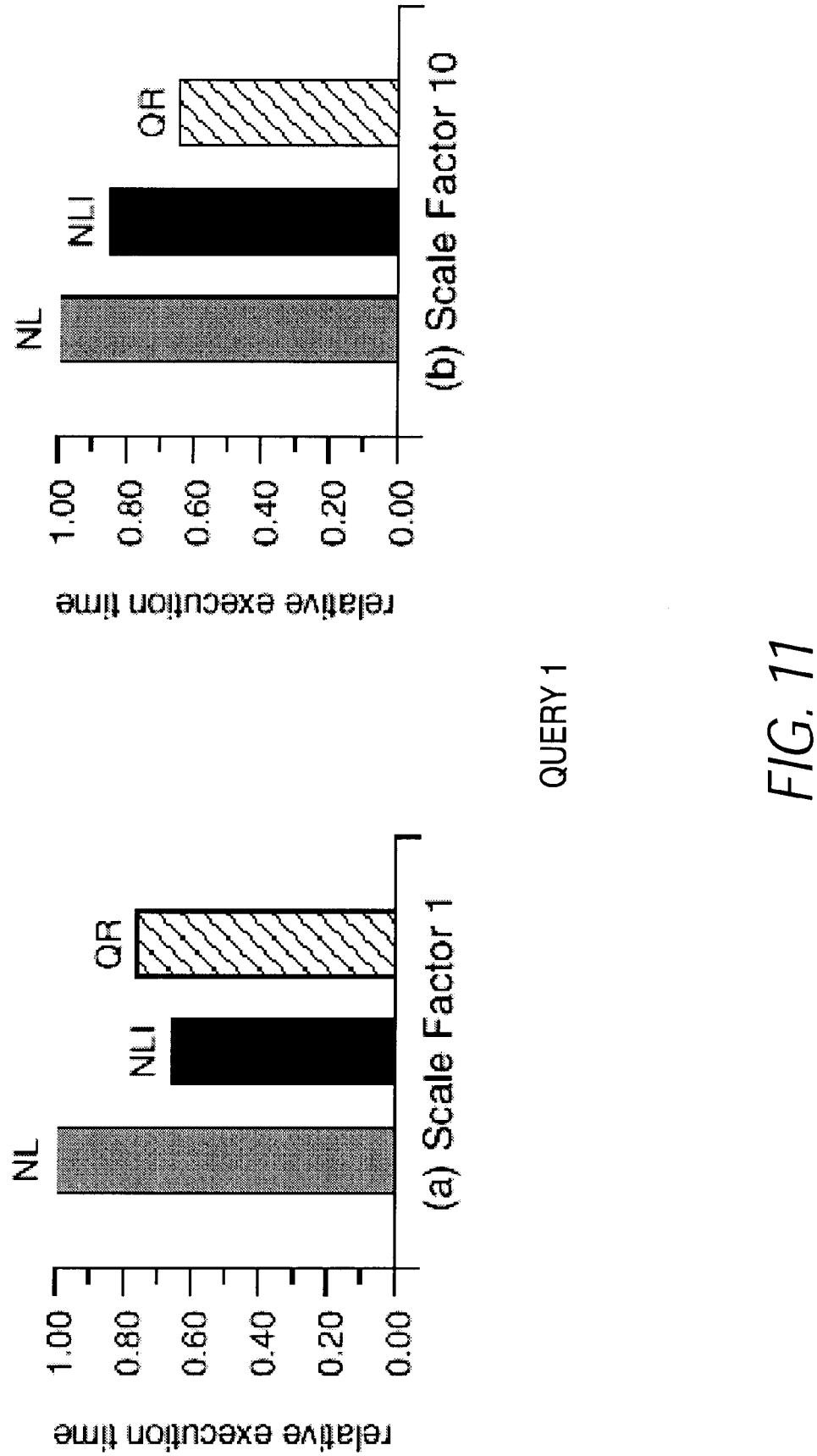
FIG. 11 displays two graphs illustrating the results of rewriting the query.
Figure 12:
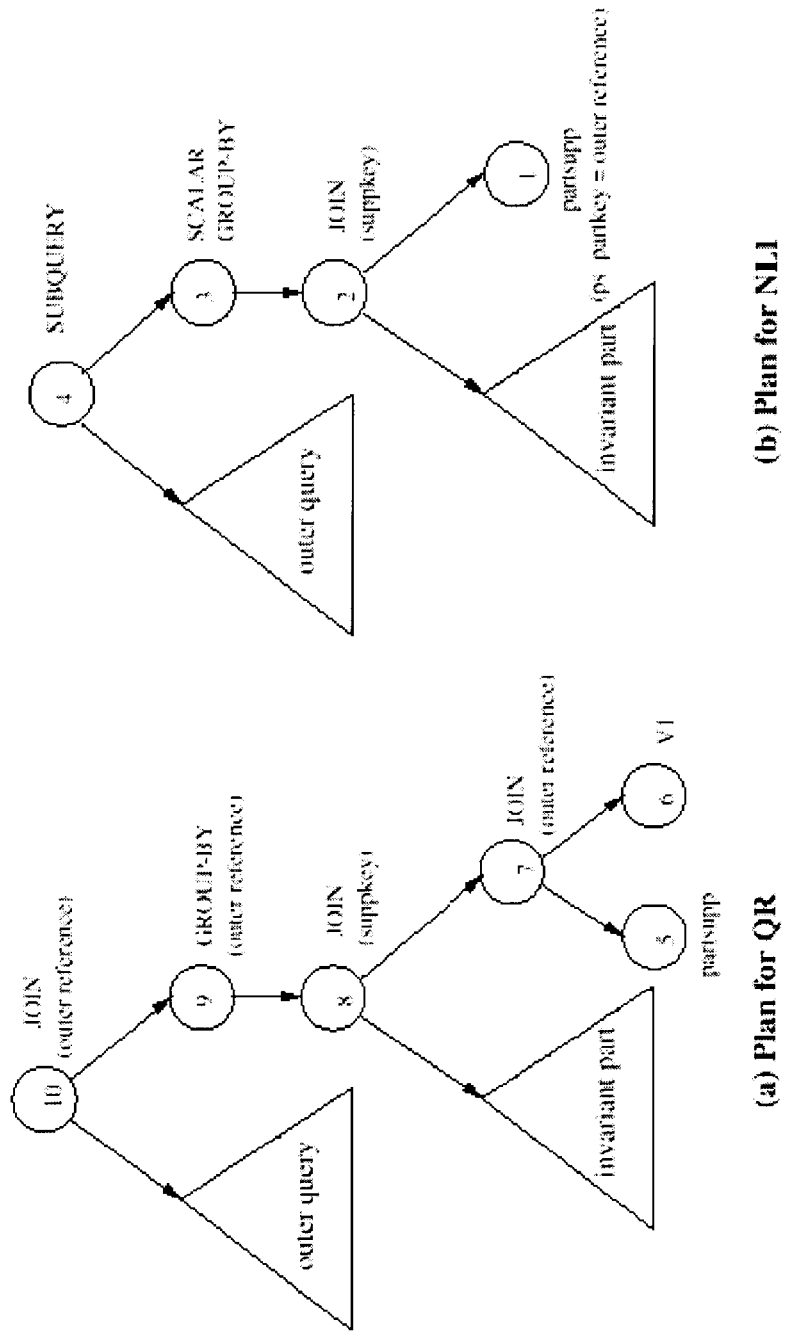
FIG. 12 is a diagram illustrating the query plan for the query.

At scale factor 1, the time for QR remains the same whether V1 is materialized or not since all the data can fit into memory. FIG. 11(*a*) shows the result. NL is about 25% worse than QR, which is in turn, about 15% worse than NLI. It is not surprising that QR is better than NL. But in this case, NLI can be better than QR. A closer look at the query plans of NLI and QR is shown in FIG. 12. The join columns and the grouping columns are listed next to the corresponding nodes. The plans for the outer query and the invariant part enclosed in triangles are the same for both techniques. In FIG. 12(*a*), QR first joins the variant part (node 5) with all the values of the outer reference. Next, the intermediate result is joined with the invariant part. Then a group-by is performed on the outer reference. Finally the group-by result is joined with the outer query block. It is important to notice that some join columns and the grouping column are the same, namely, the outer reference. The query optimizer chooses to implement node 10 with a hash join and node 8 with a sort-merge join on a column different from the outer reference, which cuts the possible liaison between the join in node 7 and the group-by in node 9. The way that NLI evaluates the query can be visualized as partitioning the subquery on the outer reference. Each partition is then evaluated separately and results are combined at the subquery node. The evaluation plan for each partition is shown in FIG. 12(*b*). A nice feature of this plan is that partitioning is shared by more than one node (namely, node 1, 3, 4). Potentially, the optimizer can choose an indexed join for node 10 in the AQ plan and make it as good as NLI. But this is very challenging since the optimizer has to include all the join columns and group-by columns as "interesting orders" (see, e.g., Selinger et al.), possibly from different query blocks. Techniques of pushing down sorts in joins have been proposed by Simmen et al. (David Simmen, Eugene Shekita, and Timothy Malkemus, *Fundamental techniques for order optimization,* In Proceedings of the ACM SIGMOD Conference, pages 57–67, 1996). Unfortunately, the process of pushing down sort-ahead orders increases the complexity of join enumeration (see, e.g., Kiyoshi Ono and Guy M. Lohman, *Measuring the complexity of join enumeration in query optimization,* In Proceedings of the 16th VLDB Conference, pages 314–325, 1990), possibly by a factor of $O(n^2)$ for n sort-ahead orders. This may become a problem when n is large. To summarize, at scale factor 1, data can fit into memory and the query is CPU cost dominated. The most CPU intensive operations are partitioning operations such as sorting and hashing. So avoiding extra partitioning can make a significant difference.

FIG. 11(*b*) shows the result of repeating the same query at scale factor 10. This time the order of the three techniques is QR, NLI and NL, with QR being the best. There are two main reasons for the different rankings at scale factor 1 and 10. First, at scale factor 10, the relevant part of data set is too large to fit into memory. So for the nested iteration methods, both NL and NLI, there is thrashing in the buffer manager which increased their actual costs. A profile analysis indicates that a significant portion of time for NLI is spent on reading pages from disk. Appropriate clustering and a more sophisticated buffer management will be helpful in addressing this issue which will be elaborated on in Section 7. The second reason is that although the system using NLI chooses a plan that can share the work of partitioning, it also fixed the underlying join method to be of nested loop style. Thus, when the number of iterations is large, this plan is unlikely to be optimal even though the work of partitioning is shared. Furthermore, if V1 is not pre-materialized, QR is actually worse than NLI (it is still better than NL) since V0 has to be evaluated twice without sharing much I/O. This needs to be taken into account given the fact that deciding whether to materialize common views/subexpressions could be difficult (see, e.g., Timos K. Sellis, *Multiple-query optimization,* ACM Transactions on Database Systems, 13(1): 23–52, 1988).

To verify the analysis above, another experiment was done using Query 2. The corresponding rewritten query can be derived in a similar fashion, but without introducing a group-by clause. The test was done at scale factor 1 and the result is shown in FIG. 13. It can be seen that when the number of iterations is not too large (less than 3,700), NLI performs better than QR. But NLI degrades quickly when there are too many iterations. As before, both NLI and QR are much better than NL.

Figure 14:
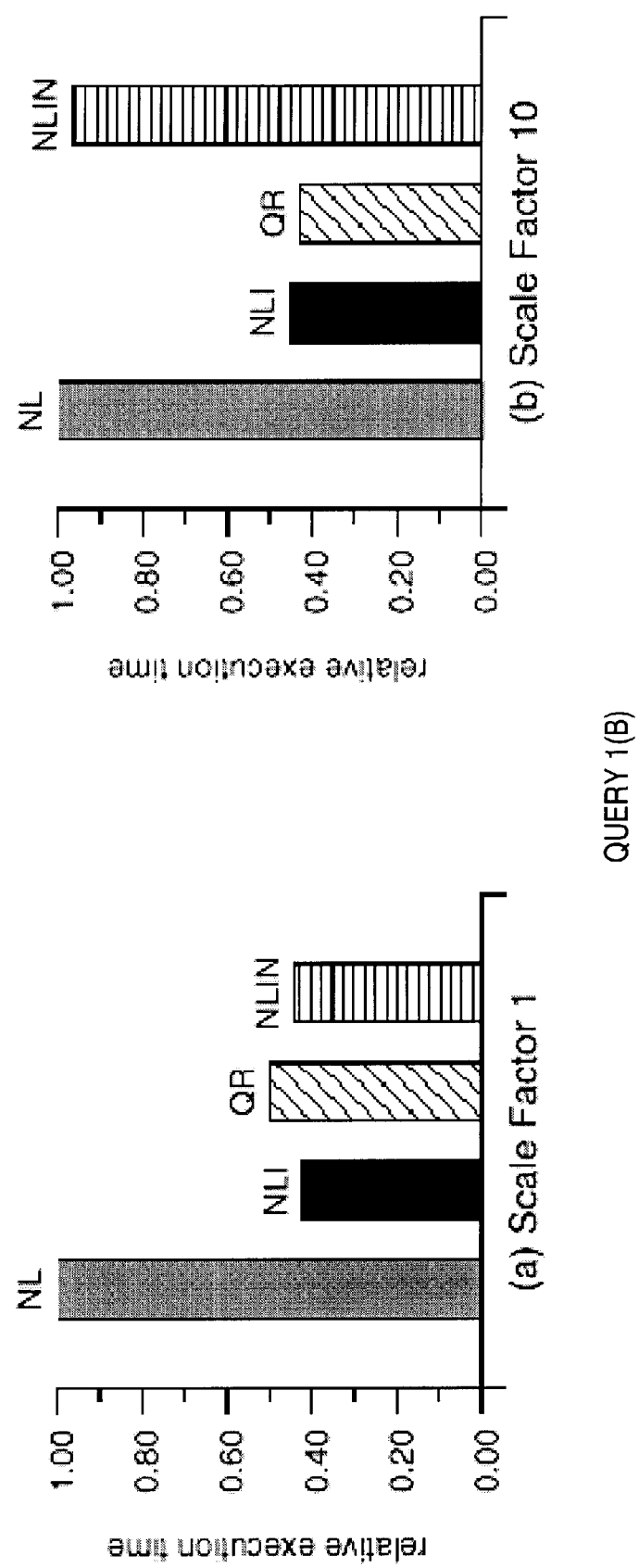
FIG. 14 displays a graph illustrating a comparison of the performance of various techniques when there are duplicates in the outer reference.

In the final test, a comparison is done of the performance of various techniques when there are duplicates in the outer reference. Query 1(b) was designed by changing the predicates on r_name in both the outer query and the subquery of Query 1 to r_name in ("EUROPE", "ASIA", "AFRICA"). On average each distinct value of the outer reference will appear 2.4 times. The results are shown in FIG. 14. NLI is the technique that will presort on the outer reference while NLIN will not presort. Both of them will use the invariant technique. First it can be seen that at both scales, NLI is better than NLIN, which proves that the post optimization technique is useful. The comparison between NLI and QR is similar to that of Query 1. NLI wins when the number of iterations is relatively small and QR wins when the number of iterations is large. Notice that, at scale factor 1, NLIN can be better than QR although it has to do more iterations than necessary.

Here, it is important to point out another possible optimization for NLI. It is very common in decision support systems that only a few of the selected rows (from the top) in a query need to be returned. In such cases, all the rows can first be fetched from the outer query block and sorted based on the columns in the order-by clause. Then iteration is done through the sorted list to evaluate the subquery and will stop when there are enough rows to return. Since fewer iterations will be invoked, better performance can be expected when using the invariant technique. In cases when there are duplicates in outer references and the outer references are not the primary ordering keys specified in the query, the above method can still be used, but the alternative hashing method (or hybrid cache, see, e.g., Hellerstein et al.) is used to avoid the reexecution of the subquery on repeated outer reference values. Similar ideas have been proposed in other different applications (e.g., as described in the provisional application serial No. 60/081,782).

To summarize the experiments, the following conclusion is drawn. The invariant technique helps when query rewriting is not applicable. As RAM becomes cheaper, more complex queries (possibly involving new CPU intensive operations) will fit into memory. The invariant technique proposed here performs particularly well for this class of queries and may suggest better evaluation plans than query rewriting. Thus an optimizer should take the invariant technique into consideration even when query rewriting techniques apply. When the retrieving cost (RCost) is too high, the optimizer will decide not to cache the invariant result. In this case, NLI reduces to NL. So NLI will never perform worse than NL.

7. Conclusions

Initially various ways of evaluating a correlated query were described. Then the technique of caching and reusing invariants was presented and it was shown how to incorporate the invariant feature into a join optimizer smoothly. Other optimization methods to improve the invariant technique were also introduced. As the most straightforward way of implementing correlated queries, the nested iteration method is the only resort when other techniques are not applicable. The invariant techniques significantly improved the naive nested iteration method. This method works better than the naive nested iteration because it avoids unnecessary re-execution of the invariant part of the subquery. This can be a huge saving when the number of iterations is large. In cases when query rewriting techniques are feasible, it was shown that neither query rewriting nor the invariant technique dominate one another. So there are some tradeoffs in using the two techniques. It is believed that both techniques should be considered on a cost basis, especially when the number of rows required from the outer query block is not very large. The optimizer should understand the advantage of both techniques and be able to make the correct choice.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a computer system having a processor, a memory, and a storage device, said storage device storing a database comprising database tables, each table comprising rows of data records, each data record storing information in database columns, a method for executing a correlated database query for selecting particular ones of said data records, the method comprising:

(a) receiving a database query specifying selection of particular ones of said data records, said database query comprising inner and outer query blocks, said inner query block comprising a subquery nested within the database query, wherein said at least one subquery references information from said outer query block;

(b) determining at least one correlated part and at least one uncorrelated part of said subquery, wherein only said correlated part is capable of being affected by changing values of the outer query block during execution of the database query;

(c) creating a cache in said memory for at least storing a result computed for said uncorrelated part after said subquery has been executed for the first time; and (d) executing said database query, including evaluating said expression of the subquery by:

(i) computing a result for the correlated part of said subquery, (ii) retrieving the cached result for the uncorrelated part of said subquery, and (iii) computing a value for said subquery by combining said computed result with said retrieved cached result.

2. The method of claim 1, wherein said database query comprises a Structured Query Language (SQL) command.

3. The method of claim 2, wherein said SQL command specifies selection of particular ones of said data records according to data records satisfying an SQL "WHERE" clause.

4. The method of claim 3, wherein said subquery expression is nested within said SQL "WHERE" clause of said SQL command.

5. The method of claim 1, wherein said correlated part is computed for each database record being scanned during query execution.

6. The method of claim 1, wherein said uncorrelated part is computed only once during query execution.

7. The method of claim 1, wherein said outer block includes host variables, for receiving information provided in conjunction with the database query.

8. The method of claim 1, wherein said database query is executed using a query plan comprising a data flow tree of operators, where each operator is represented as a node of the tree, and wherein said determining correlated and uncorrelated parts of said subquery includes marking each node as variant or invariant, accordingly.

9. The method of claim 8, wherein each node marked as invariant is without any reference to the outer block.

10. The method of claim 8, wherein each node marked as variant includes at least one reference to the outer block.

11. The method of claim 1, wherein said database query comprises a non-rewriteable correlated query.

12. The method of claim 1, wherein said database query comprises a rewriteable correlated query.

13. The method of claim 12, wherein said method first determines from a cost estimate calculation whether query execution should instead be optimized by rewriting the database query.

14. The method of claim 1, wherein said database query comprises a Decision Support System (DSS) type query.

15. The method of claim 1, wherein said database query comprises a join query, specifying a join operation of two or more database tables.

16. In a database system comprising a processor, a memory, and a storage device, said storage device storing a database comprising database tables, each table comprising rows of data records, each data record storing information in database columns, an improved query execution system comprising:

means for receiving a database query having an expression that includes a subquery nested within the database query, said subquery itself comprising an expression specifying a subquery result which is determined before evaluation of the expression for the database query is completed, wherein said subquery includes a variant portion that is dependent upon at least one value computed from a portion of the database query outside said subquery;

a cache in said memory for storing a result computed for an invariant portion of the subquery, wherein said invariant portion is not dependent upon computation of values from a portion of the database query outside said subquery;

means for executing said database query, including means for evaluating said expression of the subquery by:
  (i) computing a result for the variant portion of said subquery,
  (ii) retrieving the cached result for the invariant portion of said subquery, and
  (ii) computing a value for said expression of the subquery by combining said computed result with said retrieved cached result.

17. The system of claim 16, wherein said database query comprises a Structured Query Language (SQL) command.

18. The system of claim 17, wherein said SQL command specifies selection of particular ones of said data records according to data records satisfying an SQL "WHERE" clause.

19. The system of claim 18, wherein said subquery expression is nested within said SQL "WHERE" clause of said SQL command.

20. The system of claim 16, wherein said variant portion is computed for each database record being scanned.

21. The system of claim 16, wherein said invariant portion is computed only once during query execution.

22. The system of claim 16, wherein said outer block includes host variables, for receiving information provided in conjunction with said database query.

23. The system of claim 16, wherein said database query is executed using a query plan comprising a data flow tree of operators, where each operator is represented as a node of the tree, and wherein said system marks each node for said subquery as variant or invariant, accordingly.

24. The system of claim 23, wherein each node marked as invariant cannot include a reference to the outer block.

25. The system of claim 23, wherein each node marked as variant includes at least one reference to the outer block.

26. The system of claim 16, wherein said database query comprises a non-rewriteable correlated query.

27. The system of claim 16, wherein said database query comprises a rewriteable correlated query.

28. The system of claim 27, wherein said system first determines from a cost estimate calculation whether query execution may be optimized without rewriting the database query.

29. The system of claim 16, wherein said database query comprises a Decision Support System (DSS) query.

30. The system of claim 16, wherein said database query comprises a join query, specifying a join operation of two or more database tables.

31. In a client/server database system, an improved method for executing a query submitted by a client to a database server, said query including a subquery having variant and invariant portions, the method comprising:

dividing the subquery into variant and invariant portions;

creating a cache for caching an intermediate result computed from the portion of the subquery that is invariant from one iteration of the query to another;

executing the query for providing a query result to the client; and while executing the query, computing a query result at least in part by retrieving said intermediate result for the invariant portion from said cache and combining it with a result computed from said variant portion of said subquery.

32. The method of claim 31, wherein said variant portion is computed for each database record being scanned during execution of said query.

33. The method of claim 31, wherein said invariant portion is computed only once during query execution.

34. The method of claim 31, wherein said variant portion references an outer block of said database query.

35. The method of claim 31, wherein said database query is executed using a query plan comprising a data flow tree of operators, where each operator is represented as a node of the tree, and wherein each node for said subquery is marked as variant or invariant, accordingly.

* * * * *